(12) United States Patent
Wiemker et al.

(10) Patent No.: US 9,406,146 B2
(45) Date of Patent: Aug. 2, 2016

(54) QUANTITATIVE PERFUSION ANALYSIS

(75) Inventors: Rafael Wiemker, Kisdorf (DE); Thomas Buelow, Grosshansdorf (NL)

(73) Assignee: Koninklijke Philips N.V., Eindhoven (NL)

( * ) Notice: Subject to any disclaimer, the term of this patent is extended or adjusted under 35 U.S.C. 154(b) by 960 days.

(21) Appl. No.: 13/380,610

(22) PCT Filed: Jun. 23, 2010

(86) PCT No.: PCT/IB2010/052849
§ 371 (c)(1),
(2), (4) Date: Dec. 23, 2011

(87) PCT Pub. No.: WO2011/001332
PCT Pub. Date: Jan. 6, 2011

(65) Prior Publication Data
US 2012/0093390 A1    Apr. 19, 2012

(30) Foreign Application Priority Data

Jun. 30, 2009   (EP) .................................... 09164140

(51) Int. Cl.
*G06K 9/00*   (2006.01)
*G06T 7/40*   (2006.01)
(Continued)

(52) U.S. Cl.
CPC ............... *G06T 7/401* (2013.01); *G06T 7/0016* (2013.01); *G06T 7/20* (2013.01); *G06T 2207/10096* (2013.01); *G06T 2207/20104* (2013.01); *G06T 2207/30104* (2013.01)

(58) Field of Classification Search
CPC .................. G06T 7/0016; G06T 7/403; G06T 2207/30104; G06T 2207/10096; G06T 2207/20104
See application file for complete search history.

(56) References Cited

U.S. PATENT DOCUMENTS 5,048,103 A * 9/1991 Leclerc et al. ................. 382/294
5,360,006 A * 11/1994 Geiser et al. ................... 600/425
(Continued)

FOREIGN PATENT DOCUMENTS

EP   1473672 A1   11/2004
WO   9823298 A1   6/1998
(Continued)

OTHER PUBLICATIONS

Shen, "Image Registration by Hierarchical Matching of Local Spatial Intensity Histograms", 2004, Springer-Verlag Berlin Heidelberg MICCAI 2004, LNCS 3216, p. 582-590.*

(Continued)

*Primary Examiner* — Stephen R Koziol
*Assistant Examiner* — Timothy Choi

(57) ABSTRACT

A system is disclosed for quantitative analysis of perfusion images comprising image elements having intensity values associated therewith. The system comprises a frequency distribution computing subsystem (1) for computing a plurality of frequency distributions of the intensity values of at least part of the images. The system comprises a perfusion information extractor (2) for extracting information relating to perfusion from the plurality of frequency distributions. The perfusion information extractor (2) comprises a shift detector (3) for detecting a shift of the intensity values of the frequency distribution. The perfusion information extractor (2) is arranged for extracting the information relating to perfusion, based on the detected shift. A user interface element (8) enables a user to indicate a boundary between the core region and the rim region by a single degree of freedom. A vesselness subsystem (9) associates a vesselness value with an image element.

19 Claims, 2 Drawing Sheets

(51) Int. Cl.
  *G06T 7/20* (2006.01)
  *G06T 7/00* (2006.01)

(56) References Cited

U.S. PATENT DOCUMENTS

| | | | |
|---|---|---|---|
| 5,830,141 | A | 11/1998 | Makram-Ebeid et al. |
| 5,956,435 | A * | 9/1999 | Buzug et al. ............... 382/283 |
| 6,665,335 | B1 | 12/2003 | Rajagopal et al. |
| 6,671,540 | B1 | 12/2003 | Hochman |
| 6,681,132 | B1 | 1/2004 | Katz et al. |
| 6,718,055 | B1 * | 4/2004 | Suri ............................ 382/128 |
| 2003/0105605 | A1 | 6/2003 | Degani et al. |
| 2004/0013292 | A1 * | 1/2004 | Raunig ............. G06K 9/0014 382/128 |
| 2005/0190955 | A1 | 9/2005 | Brown |
| 2005/0207630 | A1 | 9/2005 | Chan et al. |
| 2005/0251021 | A1 | 11/2005 | Kaufman et al. |
| 2006/0072799 | A1 | 4/2006 | McLain |
| 2007/0071172 | A1 | 3/2007 | Mollus et al. |
| 2007/0099219 | A1 | 5/2007 | Teverovskiy et al. |
| 2007/0116332 | A1 * | 5/2007 | Cai et al. ...................... 382/128 |
| 2007/0133852 | A1 | 6/2007 | Collins et al. |
| 2008/0019919 | A1 | 1/2008 | Rustum et al. |
| 2008/0049994 | A1 | 2/2008 | Rognin et al. |
| 2008/0221441 | A1 | 9/2008 | Bjornerud et al. |
| 2009/0022380 | A1 * | 1/2009 | Zhao et al. ................... 382/131 |
| 2009/0028409 | A1 | 1/2009 | Tsukagoshi et al. |

FOREIGN PATENT DOCUMENTS

| | | |
|---|---|---|
| WO | 2005073915 A2 | 8/2005 |
| WO | 2006015971 A1 | 2/2006 |
| WO | 2008157843 A1 | 12/2008 |

OTHER PUBLICATIONS

Young et al., "Comparison of Region-of-Interest Analysis with Three Different Histogram Analysis Methods in the Determination of Perfusion Metrics in Patients with Brain Gliomas", 2007, Wiley-Liss, Inc., Journal of Magnetic Resonance Imaging, vol. 26, p. 1053-1063.*

Meijering et al., "Retrospective Motion Correction in DSA: A Review", Jan. 1, 1999, IEEE Transactions on Medical Imaging, vol. 18, No. 1, p. 2-21.*

Stegmann et al., "Unsupervised motion-compensation of multi-slice cardiac perfusion MRI", May 19, 2005, Elsevier B.V., Medical Image Analysis, vol. 9, p. 394-410.*

Robert Young et al, "Comparision of Region-of-Interest Analysis With Three Different Histogram Analysis Methods in the Determination of Perfusion Metrics in Patients With Brain Gliomas", Journal of Magnetic Resonance Imaging, vol. 26, No. 4, 2007, pp. 1053-1063.

Li-Yueh Hsu et al, "Automatic Assessment of Dynamic Contrast-Enhanced MRI in an Iscemic Rat Hindlimb Model: An Exploratory Study of Transplanted Multipotent Progenitor Cells", NMR in Biomedicine, vol. 21, No. 2, Feb. 1, 2008, pp. 111-119.

Yu Deuerling-Zheng et al, "Angiographic Assessment of Myocardial Perfusion Using Correlation Analysis", Proceedings Des Workshops, vol. 18, Mar. 25, 2007, pp. 409-413.

J.F. Emerson et al, "Data Analysis for Dynamic Contrast-Enhanced MRI-Based Cerebral Perfusion Measurements: Correcting for Changing Cortical CSF Volumes", vol. 3, No. 1, Mar. 1, 1995, pp. 41-48.

M. Law et al, Histogram Analysis Versus Region of Interest Analysis of Dynamic Susceptibility Contrast Perfusion MR Imaging Data in the Grading of Cerebral Gliomas, American Journal of Neuroradiology, vol. 28, Apr. 2007, pp. 761-766.

Jianguo Zhang et al, "Tumor Segmentation From Magnetic Resonance Imaging by Learning via One-Class Support Vector Machine", url: http://lear.inrialpes.fr/people/zhang/IWAIT04.pdf, Apr. 13, 2009, 5 pages.

Y. Kawata et al, "Computer-Aided Classification of Pulmonary Nodules in Surrounding and Internal Feature Spaces Using Three-Dimensional Thoracic CT Images", Proceedings of SPIE, the International Society for Optical Engineering, vol. 4684 II, 2002, pp. 704-715.

Lee, Sang Ho et al "Texture Analysis of Lesion Perfusion Volumes in Dynamic Contrast-Enhanced Breast MRI" ISBI 2008, pp. 1545-1548.

* cited by examiner

QUANTITATIVE PERFUSION ANALYSIS

FIELD OF THE INVENTION

The invention relates to perfusion analysis. More particularly, the invention relates to quantitative analysis of perfusion images comprising image elements having intensity values associated therewith.

BACKGROUND OF THE INVENTION

Perfusion analysis is used, for example in medical imaging, for a number of different purposes. For example, differential diagnosis between benign and malignant pulmonary lesions such as lung nodules may be performed using perfusion imaging and analysis. Another example is differentiation of positive or negative response of tumors to cancer therapy. Use may be made of dynamic CT scans. Such a dynamic CT scan comprises a time series of two-dimensional or three-dimensional scans including scans taken before and after administering a contrast agent, such as iodine. The scans result in images comprising image elements such as voxels (in the case of three-dimensional images) or pixels (in the case of two-dimensional images). The 'uptake' or 'enhancement' which may be visible in the images and which is due to the contrast agent's arrival at the region of interest, for example the lesion or tumor, may be interpreted as a surrogate for angiogenesis. Such angiogenesis may be a sign of malignancy and/or metabolic activity.

The uptake or enhancement is determined using an image element-by-image element (for example, voxel-wise or pixel-wise) comparison of intensity values in successive images in an image sequence, because at the time the contrast agent arrives in a region of interest, the intensity values of voxels (or pixels) in the region of interest will change. However, the uptake or enhancement is often small in comparison to the image contrast. For example, the intensity-value change caused by the contrast agent may be only 1%. Consequently, it is difficult to accurately determine the timing and/or strength of the uptake or enhancement. Moreover, the images or image volumes of a time series may not be perfectly aligned spatially. For example, the patient may have moved or changed position or an internal organ may have been deformed due to for example breathing, heartbeat, or bowel movement.

"Texture analysis of lesion perfusion volumes in dynamic contrast-enhanced breast MRI", by Sang Ho Lee et al., in: 5th IEEE International Symposium on Biomedical Imaging: From Nano to Macro, Proceedings, ISBI, 2008, pages 1545-1548, hereinafter: Lee et al., discloses a texture analysis scheme applied to perfusion volumes in dynamic contrast-enhanced breast MRI to provide a method of lesion discrimination. Automatic segmentation was performed for extraction of a lesion volume, which was divided into whole, rim, and core volume partitions. Lesion perfusion volumes were classified using a three-time-points (3TP) method of computer-aided diagnosis. According to the known 3TP method, three selected time points along the uptake characteristic are used to estimate washin and washout behavior.

SUMMARY OF THE INVENTION

It would be advantageous to have an improved system for quantitative analysis of perfusion images comprising image elements having intensity values associated therewith. To better address this concern, in a first aspect of the invention, a system is presented that comprises a frequency distribution computing subsystem for computing a plurality of frequency distributions of the intensity values of at least part of the images; and a perfusion information extractor for extracting information relating to perfusion from the plurality of frequency distributions.

The regions of the image for which the quantified perfusion information is desired may contain small vessels which are difficult to segment and which are difficult to identify and register in successive images of the plurality of images. The frequency distribution represents information from a plurality of image elements, making it unnecessary to perform comparisons of individual image elements. Moreover, since the frequency distribution preserves the information of different intensity values occurring in the image, it becomes possible to compare image regions having a particular intensity value range, without the need for explicitly segmenting these image regions. A change in the frequency distribution can be detected and used as an indicator for perfusion of the tissue to which the image relates.

The perfusion information extractor may comprise a shift detector for comparing at least two frequency distributions computed for different images. This way, a shift of the intensity values of the frequency distribution may be detected. The perfusion information extractor may be arranged for extracting the information relating to perfusion, based on the detected shift. The shift of the histogram is an indicator of contrast inflow, which allows accurate quantization of perfusion properties.

The shift detector may be arranged for comparing a plurality of frequency distributions with a single reference frequency distribution, to detect respective shifts of respective frequency distributions relative to the reference frequency distribution. This has the advantage that the respective shifts can be easily compared to each other.

The shift detector may comprise a cross-correlator for cross-correlating the at least two frequency distributions to obtain a cross-correlation curve, the shift detector being arranged for detecting the shift, based on the cross-correlation curve. The cross-correlation curve is a relatively robust way of determining the shift of the frequency distribution.

The shift detector may further comprise a peak detector for detecting a peak in the cross-correlation curve. The location of the peak may be used as an indicator of the shift value.

The perfusion information extractor may comprise a shift curve generator for combining the shifts detected for respective frequency distributions to form a shift curve, the perfusion information extractor comprising a perfusion uptake detector for detecting a perfusion uptake, based on the shift curve. The shift curve allows extracting further quantifications from the data. An example of such a quantification is perfusion uptake.

The system may comprise a region-identifying subsystem for identifying a region of interest in the images, the frequency distribution computing subsystem being arranged for computing the frequency distributions for the region of interest in the images. This way, the quantification is more specific to a particular anatomic structure, such as a tumor or a part thereof.

The region-identifying subsystem may be arranged for identifying at least part of a rim region surrounding a core region of a lesion as the region of interest. The rim region may play an important role in assessing a tumor.

The region-identifying subsystem may comprise a user interface element for enabling a user to indicate a boundary between the core region and the rim region by a single degree of freedom, the single degree of freedom being related to a size of the core region. This is considered to be a particularly efficient and/or user friendly way of adjusting said boundary.

The system may comprise a vesselness subsystem for associating a vesselness value with an image element, the vesselness value representing a likelihood that the image element belongs to a vessel, the frequency distribution computing subsystem being arranged for weighting a contribution of an intensity value of the image element to the frequency distribution, based on the vesselness value. This makes the frequency distribution more relevant to the perfusion of vessels. The feature is based on the idea that not only the intensity value is of interest, but also the structure of the image, in this case the vesselness, can be an indication of which portions of the image are important.

The information relating to perfusion may comprise at least one of: an arrival time of a contrast agent, an amount of contrast agent flowing through a region, a maximum enhancement, a time of maximum enhancement, a maximum upslope or intensity-value time derivative, a time of maximum upslope, a fitting of an analytical perfusion curve with free parameters to the observed time curve. Such quantifications are relevant in the assessment of clinical cases and can be derived using the frequency distribution-based techniques described herein.

A medical imaging workstation may comprise a display for displaying information relating to perfusion, in addition to the system set forth. This allows the system set forth to be used, for example, by a radiologist.

An imaging apparatus may comprise a scanner for generating a perfusion image and the system set forth. This allows the system to be used, for example, by an operator of the scanner or an interventionist.

A method of performing quantitative analysis of perfusion images comprising image elements having intensity values associated therewith, comprises computing a plurality of frequency distributions of the intensity values of the images; and extracting information relating to perfusion from the plurality of frequency distributions.

A computer program product may comprise instructions for causing a processor system to perform the steps of the method set forth.

It will be appreciated by those skilled in the art that two or more of the above-mentioned embodiments, implementations, and/or aspects of the invention may be combined in any way deemed useful.

Modifications and variations of the image acquisition apparatus, of the workstation, of the system, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be further elucidated and described with reference to the drawing, in which.

DETAILED DESCRIPTION OF EMBODIMENTS

Despite spatial co-registration, object motion, for example respiratory motion, compromises the direct voxel-by-voxel comparison of Hounsfield values in perfusion images, such as perfusion CT images. Also a tumor which is imaged may elastically deform between scans. The segmentation of the tumor is often ambiguous. However, the segmentation of the tumor influences the perfusion curve if it is computed from the density values inside of the segmented tumor.

Figure 1:
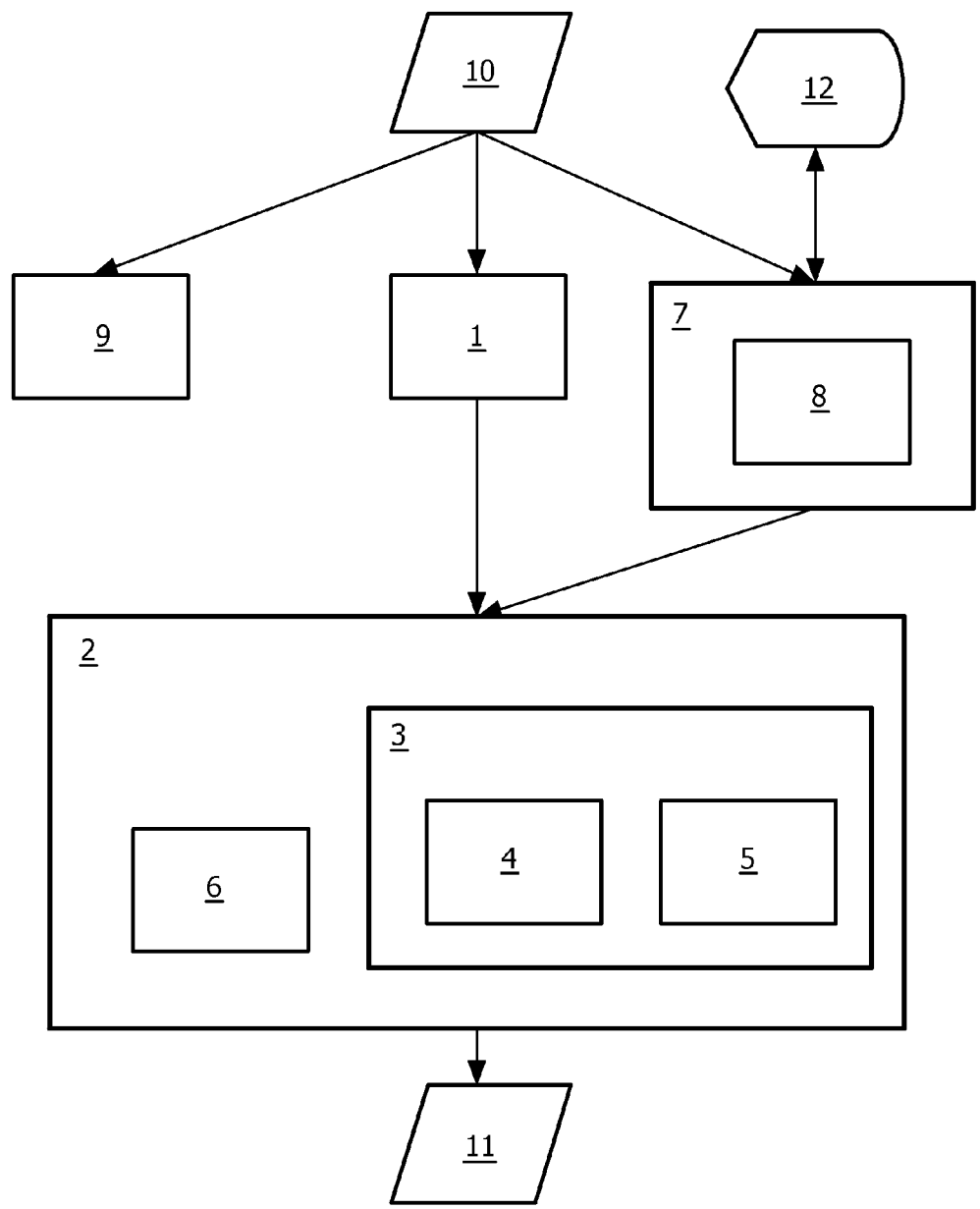
FIG. 1 is a block diagram of a system for quantitative analysis of perfusion images comprising image elements having intensity values associated therewith.

FIG. 1 illustrates, in the form of a block diagram, a system for quantitative analysis of perfusion images 10. The perfusion images 10 may comprise image elements having intensity values associated therewith. These intensity values may represent, for example, brightness values, gray values, or color component values.

The system may comprise a processor for executing instructions and a memory for storing software in the form of instructions. Moreover, the memory may be arranged for storing image information. The memory may take the form of a volatile memory such as a RAM, and/or a non-volatile memory such as a flash memory or a magnetic disk. The system may further comprise a communications port for exchange of data. For example, image data may be received via the communications port, and quantitative perfusion data may be transmitted via the communications port. The communications port can be compliant with any communications standard. For example, the communications port may comprise a network interface for communicating with a remote computer such as a PACS server via a network such as the internet. The system may further comprise a display 12 for displaying images 10 and/or quantitative perfusion information. The display 12 may further be used to show an indication of a particular image region, such as a lesion core and/or a lesion rim region. The system may further comprise a user interface for enabling a user to interactively control the system. The user interface may comprise a window system for displaying data organized in windows on the display 12, a keyboard, and/or a pointing device such as a mouse for receiving user input.

The system may comprise a frequency distribution computing subsystem 1 for computing a plurality of frequency distributions of the intensity values of at least part of the images 10. For example, a frequency distribution of the intensity values of a segmented region comprising a lesion is computed, for each image of a plurality of images 10. The segmented region may be segmented in one image and registered to the other images, for example, or the segmented region may be segmented in each image individually. The frequency distribution may comprise a histogram. The frequency distribution comprises an indication of how often a particular intensity value occurs in the image (or the segmented region of the image).

The system may further comprise a perfusion information extractor 2 for extracting information 11 relating to perfusion from the plurality of frequency distributions. By extracting the perfusion information 11 from the plurality of frequency distributions, the information of a number of image elements is combined, which makes the information relating to perfusion more accurate and/or robust.

The perfusion information extractor 2 may comprise a shift detector 3 for comparing at least two frequency distributions computed for different images for detecting a shift of the intensity values of the frequency distribution. Such comparison can be based on, for example, pattern recognition techniques. Also, the mean or median can be computed from the frequency distribution and compared. Alternatively, a model, such as a Gaussian distribution, can be fitted to the histograms and the model parameters, such as mean and variance, can be compared. The word shift refers to a situation in which an overall distribution of the intensity values roughly shifts to a higher intensity range or a lower intensity range. The shift may relate to the whole frequency distribution, or to a part of it such as the part of the frequency distribution which relates to a particular range of intensity values.

The perfusion information extractor 2 may be arranged for extracting the information relating to perfusion, based on the detected shift. The perfusion information extractor may be arranged to detect a contrast agent inflow by detecting a shift in the histogram. Similarly, a volume of contrast agent may be detected by considering the amount of the shift as well as the duration between a shift corresponding to a decrease of intensity values and the corresponding subsequent increase of intensity values. Alternatively, an increase of intensity values may be followed by a decrease of intensity values, and the duration there between may be established.

The shift detector 3 may be arranged for comparing a plurality of frequency distributions with a single reference frequency distribution. This may provide a uniform measure of the amount of contrast agent detected, based on the histogram. For example, respective shifts of respective frequency distributions may be detected relative to the reference frequency distribution. The shifts may thus be easily compared.

The shift detector may comprise a cross-correlator 4 for cross-correlating the at least two frequency distributions to obtain a cross-correlation curve. The shift detector 3 may be arranged for detecting the shift, based on the cross-correlation curve. For example, the shift detector 3 may further comprise a peak detector 5 for detecting a peak in the cross-correlation curve. The distance between the origin and the peak location is an indication of the shift.

The perfusion information extractor 2 may comprise a shift curve generator 6. This shift curve generator 6 may generate a curve representing the shift as a function of time. The data points of the curve may correspond to the shifts computed for individual images. This way, the shifts detected for individual frequency distributions are combined to form a shift curve.

The system may comprise a region-identifying subsystem 7 for identifying a region of interest in the images. For example, an automatic segmentation algorithm may be provided for automatically segmenting a lesion. The segmented lesion may be the region of interest. The frequency distribution computing subsystem 1 may be arranged for computing the frequency distributions for the region of interest in the images. The region of interest may be the same, i.e. voxel-wise, region in each image. The region of interest may be segmented separately in each image. The region of interest may be segmented for one image; the segmented region may be identified in the other images, using image registration techniques.

The region-identifying subsystem 7 may be arranged for identifying at least part of a rim region surrounding a core region of a lesion as the region of interest. Such a rim region can be established by considering a rim region of a certain thickness around a detected core region, for example. Alternatively, image features in the image are used to detect the rim region.

The region-identifying subsystem 7 may comprise a user interface element 8 for enabling a user to indicate a boundary between the core region and the rim region by a single degree of freedom, the single degree of freedom being related to a size of the core region. For example, a mouse wheel or a graphical slider control can be used for this purpose.

The system may comprise a vesselness subsystem 9 for associating a vesselness value with an image element, the vesselness value representing a likelihood that the image element belongs to a vessel. Such vesselness values may be computed in a way known in the art per se, for example a known vesselness filter may be used. The frequency distribution computing subsystem 1 may be arranged for weighting a contribution of an intensity value of the image element to the frequency distribution, based on the vesselness value. For example, the weighting operation may comprise computing a vesselness weight, based on the vesselness value of an image element. The vesselness weight may be equal to the vesselness value. The vesselness weight may be computed by normalizing the vesselness values. Instead of counting the image elements having a particular intensity value to obtain a frequency value of the frequency distribution, the vesselness weights of image elements having a particular intensity value are added to obtain a frequency value of the frequency distribution.

The information relating to perfusion may comprise at least one of: an arrival time of a contrast agent, an amount of contrast agent flowing through a region, a maximum enhancement, a time of maximum enhancement, a maximum upslope or intensity-value time derivative, a time of maximum upslope, a fitting of an analytical perfusion curve with free parameters to the observed time curve. These quantities may be derived from the frequency distribution. For example, these quantities may be based on the shift curve. Methods of deriving these quantities from image intensity time curves are known in the art per se. These methods may be adapted to use the shift curve instead of the image intensity time curve.

The system set forth may be integrated in a medical imaging workstation. For example, a suitable software program may be installed on the medical imaging workstation. Such a software program has instructions implementing various aspects of the system set forth. Likewise, the system set forth may be integrated into an imaging apparatus comprising a scanner for generating a perfusion image. Such a scanner may comprise a CT scanner or an MRI scanner or an X-ray image, or any other kind of medical scanning device.

Figure 2:
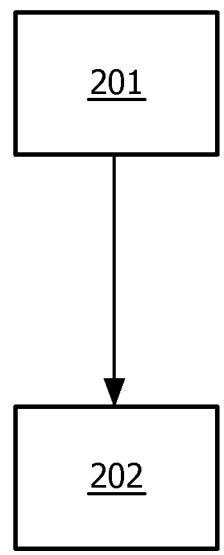
FIG. 2 is a flow chart illustrating a method of performing quantitative analysis of perfusion images comprising image elements having intensity values associated therewith.

FIG. 2 illustrates a method of performing quantitative analysis of perfusion images comprising image elements having intensity values associated therewith. The method comprises step 201 of computing a plurality of frequency distributions of the intensity values of the images. Moreover, the method may comprise step 202 of extracting information relating to perfusion from the plurality of frequency distributions. Other steps may be added based on the description of functionality of the system described above. The method may be implemented as a computer program. The computer program may be stored on a computer-readable medium.

In this text, an interactive combined visualization and measurement approach is described for four-dimensional spatiotemporal image data sets of, for example, tumor perfusion (e.g. dynamic CT). In this approach, the user may define a region of interest (ROI) around the tumor and an intensity value range. The user can interactively change the region of interest as well as the considered intensity value range, and the qualifying voxels may be interactively displayed on the image volume. From the qualifying image elements, an intensity value histogram may be computed and displayed, for each scan of the time series. All histograms may be cross-correlated with the histogram of the native scan. The native scan is a scan in which no contrast agent is visible, for example because the scan was acquired before administration of contrast agent. For each scan, a cross correlation curve may be computed by applying positive and/or negative shifts to the histogram, and correlating with e.g. the native scan. The correlation curves may be displayed to the user to convey a confidence measure by virtue of the smoothness of the correlation curves. The curve peaks may be determined and taken as effective perfusion uptake values to form a perfusion time curve, which may be displayed to the user. Any further interactive change in the ROI or intensity value range may trigger an instantaneous re-computation of the correlation curves and/or the resulting perfusion time curve. This gives the user an intuitive feeling for the stability of the perfusion time curve.

The techniques described in this text may provide a relatively robust measurement of the overall 'effective' perfusion time curve, which may be relatively insensitive to missing image parts, inaccurate delineation of the tumor boundary, minor registration errors, elastic tumor deformation, and/or respiratory motion.

In principle, any suitable segmentation algorithm may be used for segmenting the core region and/or rim region of the tumor. Moreover, the height of a correlation curve peak may give a confidence measure of the perfusion time curve derived therefrom.

Interactive selection of a region of interest around a tumor may be performed, for example by indicating a circle or rectangle containing the tumor; the size can be controlled by e.g. a mouse-wheel. Semi-automatic or fully-automatic segmentation of the tumor and/or rim region in at least one of the images may alternatively be performed. A number of different segmentation methods are available and can be used, e.g. depending on the imaging modality. The segmentation can be carried out on one image volume only, and can then be carried over to the other registered image volumes. Alternatively, the segmentation can be carried out independently on each of the image volumes of the time series.

Automatic extraction of the vessel network around the tumor may be performed. This automatic extraction may be performed separately for each of the images of the time series. The vessel extraction may be carried out independently on each image volume, as an alternative to using registration techniques, because the registration accuracy might be insufficient to carry one vessel extraction over to the other image volumes, especially in elastic organs like lungs, breast or liver. Several vessel extraction methods are available. For example, a vesselness filter may be applied to each image element; the vesselness filter is based on for example the first or second derivative (structure tensor or Hesse-matrix filters). Optionally, such a vesselness filter can work on multiple scales (scale-space approach). The vessel filter can, for example, be applied throughout the ROI around the tumor, or alternatively, it can be used as a prioritization in a region growing algorithm starting out from the tumor segmentation (so that only structures which are connected to the tumor are extracted). The vessel extraction may result in, for example, a binary image (in which each image element is labeled as belonging to a vessel yes or no) or a fuzzy or probabilistic vesselness weight image.

Visualization of an extracted vessel network may be performed, using for example maximum intensity projection of the vesselness weights of the image elements. Tumor segmentation may be overlaid as a color image to improve visual orientation.

Computation and display of the intensity-value histograms may be performed (e.g. one histogram for each scan of the time series). Histograms may be computed from all the image elements in a region of interest such as the core or the rim region. Each voxel may be weighted by its fuzzy or probabilistic vesselness, for example the vesselness resulting from the vesselness filter.

The intensity-value range to be considered by the perfusion quantification may be interactively changed. In such a case only the image elements having intensity values in this range and/or only the part of the histogram relating to this range are considered in the computation of perfusion quantifications. The intensity-value range may be indicated e.g. by a box in the histogram display, and be controlled e.g. by mouse click and/or drag operations on the histogram.

The voxels which are included in the current region of interest and/or intensity-value range may be indicated in the image, for example using a color overlay. This color overlay may be updated whenever the user or the system changes these parameters.

Computation and display of the cross-correlation curves of a pair of histograms may be performed, the two histograms relating to different images. For example, cross-correlation curves are computed of the histogram of the native scan cross-correlated with the histogram of respective subsequent scans.

Determination of the peak positions of the cross-correlation curves and/or display of the resulting perfusion time curve may be performed. The peak position of the cross-correlation curve corresponds to the shift position yielding the highest correlation with the histogram of the native scan. Alternatively, mean, mode, or median value of each histogram may be computed and compared.

A spatial core-to-rim-curve of the tumor may be computed and/or displayed. Such a curve may show a mean density or relative density, i.e. uptake with respect to the native scan, as a function of distance from the core region, for example.

The user may be enabled to change the ROI or intensity-value range after or before the computations and display of the results. Whenever the user changes the ROI or intensity-value range, the displayed results may be interactively updated. The user may be enabled to interactively change the partitioning into core- and rim-region of the tumor by adjusting one degree of freedom (e.g. mouse wheel, mouse move in the spatial core-to-rim-curve), and the user may be provided with immediate visual feedback in the color-overlay of the tumor. Moreover, the displayed time curves for core- and rim-region may be interactively updated whenever the user changes the core and rim partitioning.

Segmentation of the user-selected tumor into a core region and a peripheral rim region may be performed automatically. The enhancement (perfusion uptake curves) may be averaged over these regions. The user may be provided with a user interface element to interactively change the partitioning between core- and rim-region by manipulating or adjusting a single degree of freedom (e.g. using the mouse wheel, a trackbar slider, or mouse moving a marker on a core-to-rim profile-curve). The system may maintain the shape of the tumor automatically, based on the image content, if the user changes the single degree of freedom. The single degree of freedom may be the size of the tumor. This may be conveniently achieved by computation of a three-dimensional distance transformation of the segmented volume. The voxels of the tumor segmentation may be ordered by increasing the distance to the tumor boundary. Any partitioning then includes all voxels up to a certain distance value. The same partitioning may be applied to any of the images of the image series, using the prior co-registration of the local volume of interest.

After adjusting the core or rim region, the temporal curves for core- and/or rim-region may be updated in interactive speed. This allows the user to get an understanding and/or quantification of the spatially varying temporal perfusion characteristics of the tumor. Instead of two separate regions (and thus, curves), also a number N of layers can be identified in the image, the layers forming shells around the core region. Histograms and perfusion curves can be computed and displayed for any of the layers.

An automatic extraction may be provided of the adjacent vessel network attached to a given tumor in respective images of the time series. The extracted vascular network may be displayed to the user and may be overlaid with the automatically segmented tumor. Then a density histogram may be constructed from a local region of interest (ROI) in which the frequencies are weighted by the vesselness of each voxel, so that the histogram reflects the density of the vascular network more than the density of the surrounding parenchyma (which may change in density due to its elastic nature, without significance for the diagnostics).

It will be appreciated that the invention also extends to computer programs, particularly computer programs on or in a carrier, adapted for putting the invention into practice. The program may be in the form of source code, object code, a code intermediate source and object code such as a partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for quantitative analysis of perfusion images comprising image elements having intensity values associated therewith, comprising
   a frequency distribution computing subsystem including a processor configured to compute a plurality of frequency distributions of the intensity values of at least part of the perfusion images, wherein the perfusion images include a plurality of images of a same region of interest at different time points over a predetermined period of time and include voxels or pixels with intensity values corresponding to a concentration of contrast agent uptake in tissue of the region of interest over the predetermined period of time; and
   a perfusion information extractor including the processor further configured to compare the plurality of frequency distributions with a single reference frequency distribution to detect respective shifts of respective frequency distributions relative to the reference frequency and extract information relating to perfusion from the plurality of frequency distributions based on the shifts, wherein the information relating to perfusion includes quantitative perfusion information about the contrast agent uptake.

2. The system according to claim 1, wherein the processor compares at least two frequency distributions computed for different images for detecting a shift of the intensity values of the frequency distributions extract the information relating to perfusion, based on the detected shift.

3. The system according to claim 2, wherein the processor comprises a cross-correlator for cross-correlating the at least two frequency distributions to obtain a cross correlation curve, and the processor detects the shift, based on the cross-correlation curve.

4. The system according to claim 3, the wherein the processor further comprises a peak detector for detecting a peak in the cross-correlation curve.

5. The system according to claim 2, the perfusion information extractor comprising a shift curve generator for combining the shifts detected for respective frequency distributions to form a shift curve.

6. The system according to claim 1, further comprising a region-identifying subsystem including the processor further configured to identify a region of interest in the images, the frequency distribution computing subsystem being arranged for computing the frequency distributions for the region of interest in the images.

7. The system according to claim 6, the region-identifying subsystem being arranged for identifying at least part of a rim region surrounding a core region of a lesion as the region of interest.

8. The system according to claim 7, the region-identifying subsystem comprising a user interface element for enabling a user to indicate a boundary between the core region and the rim region by a single degree of freedom, the single degree of freedom being related to a size of the core region.

9. The system according to claim 1, further comprising a vesselness subsystem including the processor further configured to associate a vesselness value with an image element, the vesselness value representing a likelihood that the image element belongs to a vessel, the frequency distribution computing subsystem being arranged for weighting a contribution of an intensity value of the image element to the frequency distribution, based on the vesselness value.

10. The system according to claim 1, the information relating to perfusion comprising at least one of: an arrival time of a contrast agent, an amount of contrast agent flowing through a region, a maximum enhancement, a time of maximum enhancement, a maximum upslope or intensity-value time derivative, a time of maximum upslope, a fitting of an analytical perfusion curve with free parameters to the observed time curve.

11. The system according to claim 1, wherein the perfusion images are a result of a dynamic scan performed before and after administering a contrast agent.

12. The system according to claim 1, further comprising:
acquiring data through a time series of scans before and after administering a contrast agent; and
generating the perfusion images by reconstructing the acquired data.

13. The system according to claim 11, wherein the perfusion images are successive contrast images of the dynamic scan.

14. The system according to claim 2, where the perfusion information extractor detects contrast agent inflow by detecting a shift in the intensity values of the frequency distributions of two compared frequency distributions of the frequency distributions computed for the different images.

15. The system according to claim 2, where the perfusion information extractor detects a volume of contrast agent based on an amount of the shift in the intensity values and further based on one of a time duration between a shift corresponding to a decrease of the intensity values and a corresponding subsequent increase of the intensity values or an increase of the intensity values followed by a decrease of the intensity values.

16. The system according to claim 1, further comprising:
computing a spatial core-to-rim-curve of the tissue that indicates contrast agent uptake with respect to a native scan as a function of a distance from a core region.

17. The system according to claim 16, further comprising:
partitioning the tissue into the core region and a rim region, and computing the spatial core-to-rim-curve based on the partitioning.

18. A system for quantitative analysis of perfusion images comprising image elements having intensity values associated therewith, comprising
a frequency distribution computing subsystem including a processor configured to compute a plurality of frequency distributions of the intensity values of at least part of the perfusion images, wherein the perfusion images include a plurality of images of a same region of interest at different time points over a predetermined period of time and include voxels or pixels with intensity values corresponding to a concentration of contrast agent uptake in tissue of the region of interest over the predetermined period of time; and
a perfusion information extractor including the processor further configured to compare at least two frequency distributions computed for different images for detecting a shift of the intensity values of the frequency distribution, extract information relating to perfusion from the plurality of frequency distributions based on the detected shift, wherein the information relating to perfusion includes quantitative perfusion information about the contrast agent uptake, and combine shifts detected for respective frequency distributions to form a shift curve.

19. A system for quantitative analysis of perfusion images comprising image elements having intensity values associated therewith, comprising
a frequency distribution computing subsystem including a processor configured to compute a plurality of frequency distributions of the intensity values of at least part of the perfusion images, wherein the perfusion images include a plurality of images of a same region of interest at different time points over a predetermined period of time and include voxels or pixels with intensity values corresponding to a concentration of contrast agent uptake in tissue of the region of interest over the predetermined period of time;
a perfusion information extractor including the processor further configured to extract information relating to perfusion from the plurality of frequency distributions, wherein the information relating to perfusion includes quantitative perfusion information about the contrast agent uptake; and
a vesselness subsystem including the processor further configured to associate a vesselness value with an image element, the vesselness value representing a likelihood that the image element belongs to a vessel, the frequency distribution computing subsystem being arranged for weighting a contribution of an intensity value of the image element to the frequency distribution, based on the vesselness value.

\* \* \* \* \*